Patented May 16, 1944

2,348,795

UNITED STATES PATENT OFFICE 2,348,795

CLEANING AND DISINFECTING COMPOSITION

Günther Endres, Hamburg, Germany; vested in the Alien Property Custodian

No Drawing. Application November 10, 1939, Serial No. 303,897. In Germany December 13, 1938

3 Claims. (Cl. 252—106)

It is known that all the usual disinfecting agents such as phenols and the like are ineffective when introduced into hydrocarbons or into halogenated hydrocarbons. Thus, in solutions of benzine, carbon tetrachloride and the like they no longer exhibit a bactericidal action. This disadvantage is particularly noticeable when garments and the like are to be chemically cleaned, because it is not possible simultaneously to disinfect the garments when cleaning them with benzine, carbon tetrachloride or other fat solvents. A process by which, in addition to the chemical cleaning, the garments and the like are simultaneously disinfected is of great hygienic importance.

It has now been found that disinfecting agents having a very good effect can be obtained by adding a small quantity of an alcohol to an aliphatic hydrocarbon, such as benzine or other fat solvent or to a halogen derivative thereof, such as carbon tetrachloride or trichlorethylene. The fat solvent may consist also of a mixture of a plurality of halogen derivatives such as for example carbon tetrachloride and trichlorethylene and the like. One disinfecting agent in accordance with the invention comprises a fat solvent to which a small quantity of an aliphatic alcohol, preferably methyl alcohol, is added. Another disinfecting agent in accordance with the invention comprises a fat solvent to which a small quantity of an unsaturated alcohol is added. A further disinfecting agent in accordance with the invention comprises a fat solvent to which a small quantity of an aromatic alcohol is added.

It has been found that the disinfecting effect can be still further increased when an agent having a bactericidal effect in the presence of water is added in small quantities to the fat solvent in addition to the alcohol preferably methyl alcohol. Thus a small quantity of an alcohol and a small quantity of organic compounds with phenolic hydroxyl-groups can be added to the fat solvent. Also a small quantity of an alcohol and a small quantity of a mercury compound can be added to the fat solvent. Again another disinfecting agent in accordance with the invention comprises a fat solvent to which a small quantity of an alcohol and a small quantity of a quaternary ammonium compound, having bactericidal properties in the presence of water, are added. Again a small quantity of an alcohol and a small quantity of formic acid can be added to the fat solvent. The term fat solvent is used to include also mixture of different fat solvents.

Example 1

Pieces of cotton wool were immersed in bacterial suspensions of *Staphylococcus aureus* and *Bacterium coli* and after about ¼ hour were removed from the suspension and dried at a temperature of 37° C. The dry wool carrying the germs was then immersed in a disinfecting agent of the present invention. After 30–120 minutes the wool was removed from the solution and incubated in a suitable culture solution. After 48 hours incubation the following results were obtained:

|   |   | Duration of action | | | |
|---|---|---|---|---|---|
|   |   | Staphylococcus | | Bacterium coli | |
|   |   | 30 minutes | 120 minutes | 30 minutes | 120 minutes |
| 1 | Benzine | + | + | + | + |
| 2 | A mixture of benzine and 2% methyl alcohol and 0.2% isopropyl alcohol | − | − | − | − |

In this table:
+ = positive growth of bacteria.
− = no growth.

Both kinds of bacteria are, as is well known, not destroyed by benzine while the cultures from a benzine solution which contained an addition of 2% methyl alcohol and 0.2% isopropyl alcohol were totally destroyed. The same results are obtained with a mixture of benzine and 2% methyl alcohol and 1% ethyl alcohol.

Example 2

|   |   | Duration of action | |
|---|---|---|---|
|   |   | Staphylococcus, 120 minutes | Bacterium coli, 120 minutes |
| 1 | Benzine | + | + |
| 1a | A mixture of benzine and 2% ethyl alcohol | + | − |
| 1b | A mixture of benzine, 2% ethyl alcohol and 0.2% corrosive sublimate | − | − |
| 2 | Carbon tetrachloride | + | + |
| 2a | A mixture of carbon tetrachloride and 4% methyl alcohol | + | − |
| 2b | A mixture of carbon tetrachloride and 0.4% of 2-benzyl-4-chlorophenol | + | + |
| 2c | A mixture of carbon tetrachloride, 4% methyl alcohol and 0.4% 2-benzyl-4-chlorophenol | − | − |
| 2d | A mixture of carbon tetrachloride, 4% methyl alcohol and 0.4% quaternary ammonium salt | − | − |
| 2e | A mixture of carbon tetrachloride, 4% methyl alcohol and 0.2% corrosive sublimate | − | − |

From this table it will be clear that, for example, a mixture of carbon tetrachloride and 4% methyl alcohol does not destroy Staphylococci after two hours but, on the other hand, will completely destroy *Bacterium coli*. If, however, another disinfecting agent of organic or inorganic origin which is effective in aqueous solution is added to this mixture the Staphylococci are also destroyed.

As the quaternary salt for these experiments there was used benzylmethylaminoaceticacid-dodecylamidechlormethylate. Of course any other amines or ammonia compounds having disinfecting properties can be used.

*Example 3*

Benzine or trichlorethylene to which 2% methyl alcohol and 0.1% formic acid have been added exhibits an excellent bactericidal effect. *Staphylococcus aureus* and *Bacterium coli* were completely destroyed by this mixture in one hour using the experimental methods described.

The invention is of considerable practical importance and enables materials to be effectively disinfected while being chemically cleaned so that the transfer of infectious germs is effectively prevented.

I claim:

1. A combined dry-cleaning and disinfecting composition comprising a mixture of carbon tetrachloride with approximately four percentum of methyl alcohol and from two-tenths to four-tenths per cent of a bactericide selected from the group consisting of corrosive sublimate and 2-benzyl-4-chlorophenol.

2. A cleaning and disinfecting composition comprising a mixture of carbon tetrachloride, 4% methyl alcohol and 0.4% 2-benzyl-4-chlorophenol.

3. A cleaning and disinfecting composition comprising a mixture of carbon tetrachloride, 4% methyl alcohol and 0.2% corrosive sublimate.

GÜNTHER ENDRES.